(12) United States Patent
Watanabe et al.

(10) Patent No.: US 9,788,385 B2
(45) Date of Patent: Oct. 10, 2017

(54) LIGHTING DEVICE, LIGHTING FIXTURE, AND LIGHTING SYSTEM

(71) Applicant: Panasonic Intellectual Property Management Co., Ltd., Osaka (JP)

(72) Inventors: Koji Watanabe, Kyoto (JP); Hiroyuki Matsumoto, Hyogo (JP); Yuichirou Hirowatari, Osaka (JP); Koji Uenoyama, Kyoto (JP); Shinichi Murakami, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/192,369

(22) Filed: Jun. 24, 2016

(65) Prior Publication Data
US 2016/0381759 A1    Dec. 29, 2016

(30) Foreign Application Priority Data

Jun. 29, 2015  (JP) ................................. 2015-129948

(51) Int. Cl.
*H05B 33/08* (2006.01)

(52) U.S. Cl.
CPC ..... *H05B 33/0857* (2013.01); *H05B 33/0803* (2013.01); *H05B 33/0845* (2013.01); *H05B 33/0866* (2013.01)

(58) Field of Classification Search
CPC ............ H05B 33/0866; H05B 33/0803; H05B 33/0857; H05B 33/086
See application file for complete search history.

(56) References Cited

U.S. PATENT DOCUMENTS

| 2008/0245949 A1* | 10/2008 | Morimoto ................. G01J 1/32 250/205 |
| 2009/0033612 A1* | 2/2009 | Roberts ................ G09G 3/3413 345/102 |
| 2011/0175952 A1 | 7/2011 | Nabesawa et al. |
| 2013/0176326 A1* | 7/2013 | Safaee-Rad ........... G06T 11/001 345/590 |
| 2014/0002481 A1* | 1/2014 | Broughton ............... G09G 5/02 345/591 |
| 2014/0312805 A1* | 10/2014 | Kim ................... H05B 33/0845 315/294 |

(Continued)

FOREIGN PATENT DOCUMENTS

| JP | 2002-100485 A | 4/2002 |
| JP | 2012-022880 A | 2/2012 |

(Continued)

*Primary Examiner* — Tung X Le
*Assistant Examiner* — Raymond R Chai
(74) *Attorney, Agent, or Firm* — Renner Otto Boisselle & Sklar, LLP

(57) ABSTRACT

The lighting device includes a control unit configured to set desired values of drive currents of solid state light sources with different light emission colors. The control unit has a normal mode and a correction mode. The normal mode is a mode of setting the desired values to normal desired values corresponding to instruction values representing a desired color of colors. The correction mode is a mode of setting the desired values to corrected desired values corresponding to corrected instruction values obtained by correcting the instruction values.

8 Claims, 8 Drawing Sheets

(56) References Cited

U.S. PATENT DOCUMENTS

| 2015/0022110 A1* | 1/2015 | Sisto | H05B 33/086 |
| | | | 315/210 |
| 2015/0173151 A1* | 6/2015 | Ter Weeme | H05B 33/0863 |
| | | | 315/294 |

FOREIGN PATENT DOCUMENTS

| JP | 2014-082006 A | 5/2014 |
| WO | WO 2010/041493 A | 4/2010 |

* cited by examiner

LIGHTING DEVICE, LIGHTING FIXTURE, AND LIGHTING SYSTEM

CROSS-REFERENCE TO RELATED APPLICATION

The present application is based upon and claims the benefit of a priority of Japanese Patent Application No. 2015-129948, filed on Jun. 29, 2015, the entire contents of which are incorporated herein by reference.

TECHNICAL FIELD

The present disclosure generally relates to lighting devices, lighting fixtures, and lighting systems, and particularly to a lighting device for lighting solid state light sources such as light emitting diodes, a lighting fixture including the lighting device and solid state light sources, and a lighting system including one or more lighting fixtures described above.

BACKGROUND ART

Document 1 (JP 2002-100485 A) discloses a color correction device. The color correction device of Document 1 is configured to correct a light emission color of an illumination device (liquid crystal display (LCD) back light) used in a liquid crystal display of a mobile phone. The LCD back light includes a light source which is a RGB light emitting diode (LED) arbitrarily adjustable in light emission colors of three primary colors of red, green, and blue. The color correction device (controller of the mobile phone) preliminarily stores, in a read only memory (ROM), information indicative of percentages of currents supplied to red, green, and blue LEDs required for realizing a set color (color selected according to settings), and such information may be include ten sets of table values. The table values are defined as ratios of actual currents to allowable currents of red, green, and blue LEDs necessary for the RGB LED to emit light with a corresponding one of seven colors of red, green, blue, aqua, yellow, purple, and white.

When receiving an input of selecting any of the sets of table values via a keypad used for inputting phone numbers, the color correction device retrieves the set of table values corresponding to the input from the ROM, and corrects the color according to the retrieved set of table values. As a result, the color correction device can correct a deviation of an emission color resulting from an individual difference of the RGB LED.

In some cases, such correction of the color of the light emission color may cause an undesirable change in a range of available colors.

SUMMARY

An objective of the present disclosure is to suppress an undesired effect due to an individual difference in color of illumination light and nevertheless suppress a decrease in a range of available colors.

The lighting device of one aspect according to the present disclosure includes: lighting circuits; and a control unit. The lighting circuits are configured to supply drive currents according to desired values to solid state light sources with different light emission colors, individually. The control unit is configured to set the desired values of the lighting circuits. The control unit has a normal mode and a correction mode. The normal mode is a mode of setting the desired values to normal desired values corresponding to instruction values representing a desired color of colors. The correction mode is a mode of setting the desired values to corrected desired values corresponding to corrected instruction values obtained by correcting the instruction values.

The lighting fixture of another aspect according to the present disclosure includes: the lighting device of the above aspect for lighting the solid state light sources; the solid state light sources; and a housing for bearing the solid state light sources and the lighting device.

The lighting system of another aspect according to the present disclosure includes: one or more lighting fixtures of the above aspect; and a controller for providing the instruction values to the one or more lighting fixtures.

BRIEF DESCRIPTION OF THE DRAWINGS

The figures depict one or more implementations in accordance with the present teaching, by way of example only, not by way of limitations.

DETAILED DESCRIPTION

1. Embodiments

Hereinafter, one embodiment according to the present disclosure is described in detail with reference to drawings. Note that, the following embodiment is one of various embodiments according to the present disclosure. The embodiments according to the present disclosure are not limited to the following embodiment, and the following embodiment may be modified in various ways according to design or the like, providing that the objective of the present disclosure would be achieved.

Figure 1:
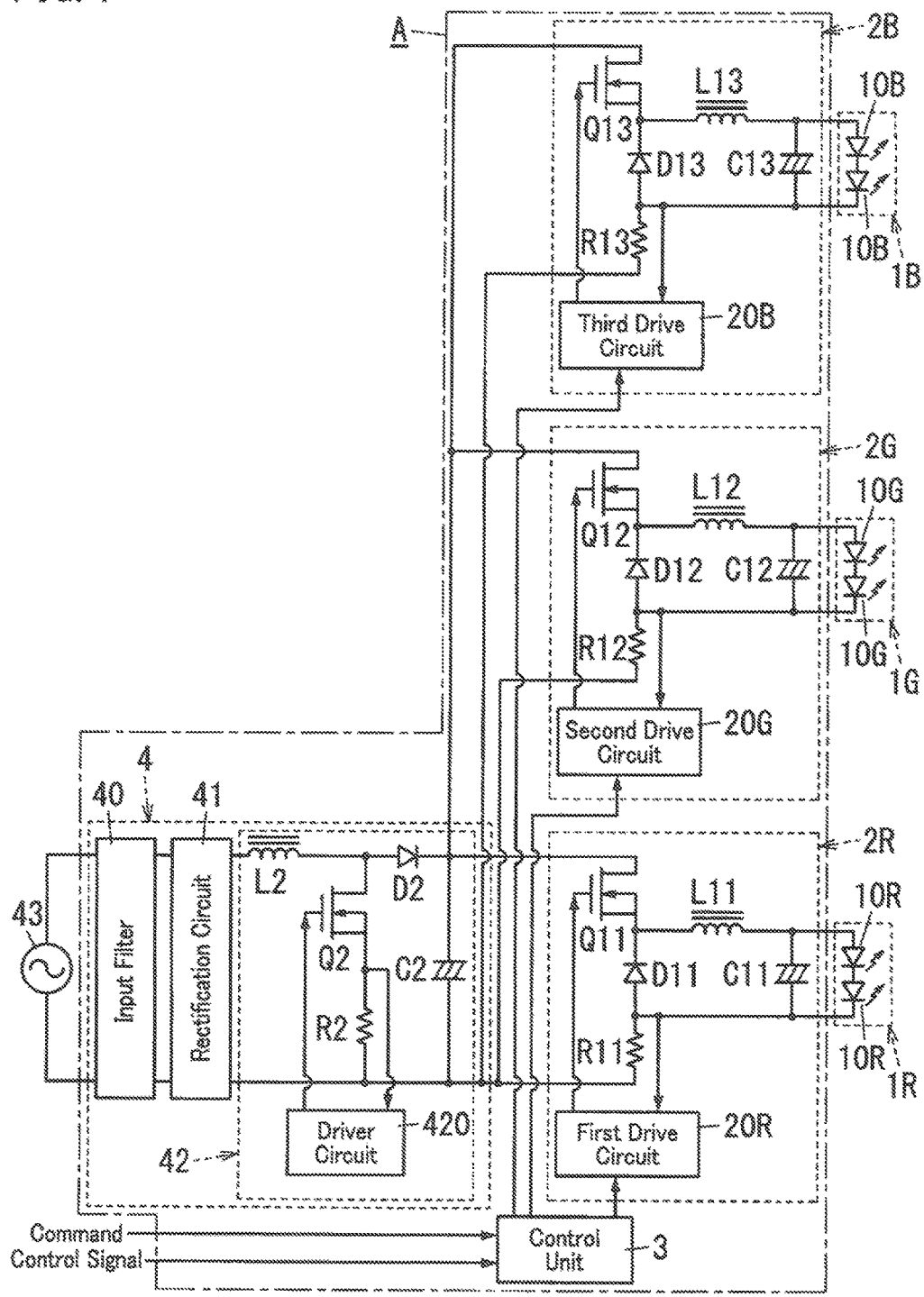
FIG. 1 is a configuration diagram of a circuit of a lighting device of one embodiment according to the present disclosure.

FIG. 1 shows a lighting device (solid state light source lighting device) A of the present embodiment for lighting solid state light sources (a first light source 1R, a second light source 1G, and a third light source 1B) with different emission colors. As shown in FIG. 1, the lighting device A includes lighting circuits (the first lighting circuit 2R, the second lighting circuit 2G, and the third lighting circuit 2B), a control unit 3, and a power supply 4. Note that, the power supply 4 is optional.

The first light source 1R includes a series circuit of first solid state light emitting elements 10R (only two of them are illustrated in FIG. 1), for example. Each first solid state light emitting element 10R is a red light emitting diode for emitting red light (visible light with a wavelength of 615 to 635 [nm], for example).

The second light source 1G includes a series circuit of second solid state light emitting elements 10G (only two of them are illustrated in FIG. 1), for example. Each second solid state light emitting element 10G is a green light emitting diode for emitting green light (visible light with a wavelength of 520 to 535 [nm], for example).

The third light source 1B includes a series circuit of third solid state light emitting elements 10B (only two of them are illustrated in FIG. 1), for example. Each third solid state light emitting element 10B is a blue light emitting diode for emitting blue light (visible light with a wavelength of 464 to 475 [nm], for example).

Note that, the first to third solid state light emitting elements 10R, 10G, and 10B each may be a solid state light emitting element other than a light emitting diode (inorganic light emitting diode), such as, an organic electroluminescence element. Further, the colors (wavelengths) of the solid state light emitting elements 10R, 10G, and 10B are only examples, and they are not limited to the colors (wavelengths) described in the embodiment, and may be colors other than the three colors of red, green, and blue.

Note that, in the following description, light composed of (or obtained by mixing) the red light of the first light source 1R, the green light of the second light source 1G, and the blue light of the third light source 1B would be referred to as illumination light. The illumination light is defined as light to be emitted from a light source unit including the first light source 1R, the second light source 1G, and the third light source 1B. The illumination light does not always include all of the red light of the first light source 1R, the green light of the second light source 1G, and the blue light of the third light source 1B. This means that the illumination light would be interpreted as including at least one of the red light of the first light source 1R, the green light of the second light source 1G, and the blue light of the third light source 1B.

The power supply 4 is configured to convert AC power supplied from a commercial AC power supply 43 into DC power. For example, it is preferable that the power supply 4 includes an input filter 40, a rectification circuit 41, and a power factor improvement circuit 42. The input filter 40 is a high frequency blocking filter, and is configured to allow a power supply voltage of the AC power supply 43 with a designated frequency (60 [Hz] or 50 [Hz]) to pass, but block a high frequency component, for example. The rectification circuit 41 may preferably include a diode bridge, for example. The power factor improvement circuit 42 may preferably include a step-up chopper circuit. The power factor improvement circuit 42 includes a switching element Q2 being a field-effect transistor, a choke coil L2, a detection resistor R2, a diode D2, a smoothing capacitor C2, and a driver circuit 420 for switching the switching element Q2. The driver circuit 420 is configured to measure a voltage across the detection resistor R2, and control a duty cycle of the switching element Q2 to keep a voltage (output voltage) across the smoothing capacitor C2 constant.

The first lighting circuit 2R is configured to supply a drive current (first drive current) to the first light source 1R. Further, the first lighting circuit 2R is configured to change the first drive current according to a desired value (first desired value) $I_{RT}$ to be provided from the control unit 3. The first lighting circuit 2R may include a step-down chopper circuit, for example. The first lighting circuit 2R includes a first switching element Q11, a first inductor L11, a first diode D11, a first capacitor C11, a first resistor R11, and a first drive circuit 20R. The first switching element Q11 may be an n-channel enhancement metal-oxide semiconductor field-effect transistor (MOSFET), for example. The first switching element Q11, the first diode DK and the first resistor R11 constitute a series circuit electrically connected between opposite output terminals of the power supply 4 (opposite ends of the smoothing capacitor C2). Further, the first inductor L11 and the first capacitor C11 constitute a series circuit electrically connected between an anode and a cathode of the first diode D11. Moreover, the first light source 1R is electrically connected between opposite ends of the first capacitor C11. The first drive circuit 20R is configured to control the duty cycle of the first switching element Q11 so that the first drive current flowing through the first resistor R11 (equivalent to a drive current flowing through the first light source 1R) is equal to the desired value $I_{RT}$. Alternatively, the first drive circuit 20R may adjust a ratio of a conduction period to a rest period. The conduction period is defined as a period in which switching control is performed on the first switching element Q11. The rest period is defined as a period in which switching control is not performed on the first switching element Q11.

The second lighting circuit 2G is configured to supply a drive current (second drive current) to the second light source 1G. Further, the second lighting circuit 2G is configured to change the second drive current according to a desired value (second desired value) $I_{GT}$ to be provided from the control unit 3. The second lighting circuit 2G may include a step-down chopper circuit, for example. The second lighting circuit 2G includes a second switching element Q12, a second inductor L12, a second diode D12, a second capacitor C12, a second resistor R12, and a second drive circuit 20G. The second switching element Q12 may be an n-channel enhancement MOSFET, for example. The second switching element Q12, the second diode D12, and the second resistor R12 constitute a series circuit electrically connected between the opposite output terminals of the power supply 4. Further, the second inductor L12 and the second capacitor C12 constitute a series circuit electrically connected between an anode and a cathode of the second diode D12. Moreover, the second light source 1G is electrically connected between opposite ends of the second capacitor C12. The second drive circuit 20G is configured to control the duty cycle of the second switching element Q12 so that the second drive current flowing through the second resistor R12 (equivalent to a drive current flowing through the second light source 1G) is equal to the desired value $I_{GT}$. Alternatively, the second drive circuit 20G may adjust a ratio of a conduction period to a rest period. The conduction period is defined as a period in which switching control is performed on the second switching element Q12. The rest period is defined as a period in which switching control is not performed on the second switching element Q12.

The third lighting circuit 2B is configured to supply a drive current (third drive current) to the third light source 1B. Further, the third lighting circuit 2B is configured to change the third drive current according to a desired value (third desired value) $I_{BT}$ to be provided from the control unit 3. The third lighting circuit 2B may include a step-down chopper circuit, for example. The third lighting circuit 2B includes a third switching element Q13, a third inductor L13, a third diode D13, a third capacitor C13, a third resistor R13, and a third drive circuit 20B. The third switching element Q13 may be an n-channel enhancement MOSFET, for example. The third switching element Q13, the third diode D13, and the third resistor R13 constitute a series circuit electrically connected between the opposite output terminals of the power supply 4. Further, the third inductor L13 and the third capacitor C13 constitute a series circuit electrically connected between an anode and a cathode of the third diode D13. Moreover, the third light source 1B is electrically connected between opposite ends of the third capacitor C13. The third drive circuit 20B is configured to control the duty cycle of the third switching element Q13 so that the third drive current flowing through the third resistor R13 (equivalent to a drive current flowing through the third light source 1B) is equal to the desired value $I_{BT}$. Alternatively, the third drive circuit 20B may adjust a ratio of a conduction period to a rest period. The conduction period is defined as a period in which switching control is performed on the third switching element Q13. The rest period is defined as a period in which switching control is not performed on the third switching element Q13.

The control unit 3 is configured to individually control the first lighting circuit 2R, the second lighting circuit 2G, and the third lighting circuit 2B to change the first drive current, the second drive current, and the third drive current to adjust a light amount of the first light source 1R, a light amount of the second light source 1G, and a light amount of the third light source 1B, respectively. As apparent from the above, the control unit 3 may be configured to control the first lighting circuit 2R, the second lighting circuit 2G, and the third lighting circuit 2B to adjust a color of the illumination light.

The control unit 3 may include a microcontroller including one or more central processing units (CPU) and one or more memories, for example. The control unit 3 executes program(s) in the one or more memories with the one or more CPUs to realize various processing as described herein.

For example, when receiving a command from an external device for dimming, the control unit 3 performs an operation of making the color of the illumination light identical to a color of light requested by the command. The external device for dimming may be a dimming control panel (controller) 8 (illustrated in FIG. 9), for example. The dimming control panel 8 may include input devices such as so-called faders, for example. The faders have operated positions corresponding to the light amounts of the respective colors of the red light, the green light, and the blue light. In summary, the dimming control panel 8 is configured to generate the instruction values $L_{[R-req]}$, $L_{[G-req]}$, and $L_{[B-req]}$ for the respective light amounts of the red light, the green light, and the blue light based on the operated positions of the respective faders which are manually operated by an operator (user). The dimming control panel 8 is configured to transmit the command including the generated instruction values $L_{[R-req]}$, $L_{[G-req]}$, and $L_{[B-req]}$ to the control unit 3 of the lighting device A. In summary, the instruction values $L_{[R-req]}$, $L_{[G-req]}$, and $L_{[B-req]}$ represent a desired color of colors (colors selectable by the dimming control panel 8). The instruction values $L_{[R-req]}$, $L_{[G-req]}$, $L_{[B-req]}$ are defined as ratios of values of the drive currents to rated values (rated current values) of the drive currents of the lighting circuits 2R, 2G, and 2B, respectively. Hereinafter, if necessary, the instruction value $L_{[R-req]}$ for the light amount of the red light, the instruction value $L_{[G-req]}$ for the light amount of the green light, and the instruction value $L_{[B-req]}$ for the light amount of the blue light are referred to as the first instruction value, the second instruction value, and the third instruction value, respectively. Additionally or alternatively, the control unit 3 may be configured to automatically adjust the instruction values $L_{[R-req]}$, $L_{[G-req]}$, $L_{[B-req]}$ in accordance with a predefined schedule.

The control unit 3 is configured to set the desired values $I_{RT}$, $I_{GT}$, and $I_{BT}$ of the lighting circuits 2R, 2G, and 2B. The control unit 3 includes control modes (a normal mode and a correction mode). The control unit 3 is configured to select either the normal mode or the correction mode according to an external input. Note that, the external input may include an external signal (e.g., a control signal from the dimming control panel 8) and an input given by a circuit (e.g., a switch of the lighting device A) other than the control unit 3, for example.

The normal mode is a mode of setting the desired values $I_{RT}$, $I_{GT}$, and $I_{BT}$ to normal desired values corresponding to given instruction values $L_{[R-req]}$, $L_{[G-req]}$, and $L_{[B-req]}$. The correction mode is a mode of setting the desired values $I_{RT}$, $I_{GT}$, and $I_{BT}$ to corrected desired values corresponding to corrected instruction values $L_{[R-sum]}$, $L_{[G-sum]}$, and $L_{[B-sum]}$ obtained by correcting the instruction values $L_{[R-req]}$, $L_{[G-req]}$, and $L_{[B-req]}$.

In more detail, the control unit 3 is configured to, in the correction mode, when receiving the command to be transmitted from the dimming control panel 8, subject the instruction values $L_{[R-req]}$, $L_{[G-req]}$, and $L_{[B-req]}$ of the respective light amounts included in the received command to a color correction process described later. Thereby, the control unit 3 obtains the instruction values (correction values) $L_{[R-sum]}$, $L_{[G-sum]}$, and $L_{[B-sum]}$ of the respective light amounts resulting from the color correction process. Additionally, the control unit 3 is configured to convert the instruction values $L_{[R-sum]}$, $L_{[G-sum]}$, and $L_{[B-sum]}$ of the respective light amounts resulting from the color correction process into the desired values (corrected desired values) $I_{RT}$, $I_{GT}$, and $I_{BT}$ of the first to third drive currents. Further, the control unit 3 is configured to provide the desired values (corrected desired values) $I_{RT}$, $I_{GT}$, and $I_{BT}$ to the first to third drive circuits 20R, 20G, and 20B of the first to third lighting circuits 2R, 2G, and 2B, respectively.

In contrast, in the normal mode, the control unit 3 does not perform the color correction process if receiving the command including the instruction values $L_{[R-req]}$, $L_{[G-req]}$, and $L_{[B-req]}$. In more detail, the control unit 3 is configured to, in the normal mode, convert the instruction values $L_{[R-req]}$, $L_{[G-req]}$, and $L_{[B-req]}$ of the respective light amounts into the desired values (normal desired values) $I_{RT}$, $I_{GT}$, and $I_{BT}$ of the first to third drive currents. Further, the control unit 3 is configured to provide the desired values (normal desired values) $I_{RT}$, $I_{GT}$, and $I_{BT}$ to the first to third drive circuits 20R, 20G, and 20B of the first to third lighting circuits 2R, 2G, and 2B, respectively.

Consequently, the first drive circuit 20R controls the duty cycle of the first switching element Q11 so as to make the first drive current supplied to the first light source 1R equal to the desired value $I_{RT}$ of the red light received from the control unit 3. Similarly, the second drive circuit 20G controls the duty cycle of the second switching element Q12 so as to make the second drive current supplied to the second light source 1G equal to the desired value $I_{GT}$ of the green light received from the control unit 3. Likewise, the third drive circuit 20B controls the duty cycle of the third switching element Q13 so as to make the third drive current supplied to the third light source 1B equal to the desired value $I_{BT}$ of the blue light received from the control unit 3. As a result, the color of the illumination light emitted from the first to third light sources 1R, 1G, and 1B is adjusted to a color designated by the operator with the dimming control panel.

Next, a lighting fixture 7 including the lighting device A according to the present embodiment is described with reference to FIG. 2 to FIG. 7. The lighting fixture 7 may be used to illuminate a background wall surface (cyclorama) of a studio of a TV station, a stage, or the like, and therefore may be a cyclorama light. Note that, embodiments according to the present disclosure are not limited to cyclorama lights.

As shown in FIG. 2 to FIG. 6, the lighting fixture 7 includes a light source unit 5 and a power source unit 6. In the following description, forward, rearward, left, right, upward, and downward directions of the lighting fixture 7 correspond to forward, rearward, left, right, upward, and downward directions shown in FIG. 2. For example, the left side of the sheet of FIG. 2 corresponds to the front side of the lighting fixture 7, and the right side of the sheet of FIG. 2 corresponds to the rear side of the lighting fixture 7. Additionally, the upper side of the sheet of FIG. 2 corresponds to the left side of the lighting fixture 7, and the lower side of the sheet of FIG. 2 corresponds to the right side of the lighting fixture 7.

Figure 3:
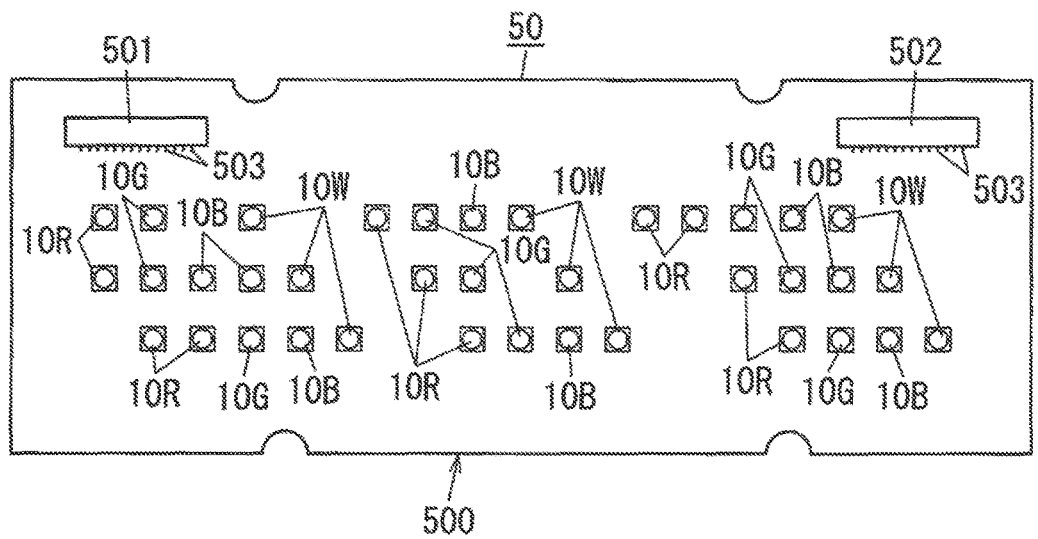
FIG. 3 is a front view of an LED module of the lighting fixture of the embodiment.

The light source unit 5 includes four LED modules 50 (see FIG. 5), a first housing 51, a reflection plate block 52, and a heat dissipation plate block 53. As shown in FIG. 3, the LED module 50 includes a substrate 500 in a rectangular shape, and further includes first solid state light emitting elements 10R, second solid state light emitting elements 10G, and third solid state light emitting elements 10B which are mounted on a surface of the substrate 500.

Note that, the lighting fixture 7 is configured so that fourth solid state light emitting elements (in FIG. 3, nine fourth solid state light emitting elements) 10W are mounted on the surface of the substrate 500 in addition to the first solid state light emitting elements 10R, the second solid state light emitting elements 10G, and the third solid state light emitting elements 10B. These fourth solid state light emitting elements 10W constitute a fourth light source, and the fourth light source is to emit light (be turned on) when receiving a drive current (fourth drive current) to be supplied from the fourth lighting circuit. Note that, the fourth lighting circuit may have the same circuit configuration as the first lighting circuit 2R, the second lighting circuit 2G, and the third lighting circuit 2B.

Further, receptacle connectors 501 and 502 are mounted on opposite ends of the surface of the substrate 500 in a lengthwise direction. The receptacle connectors 501 and 502 each include terminals 503 electrically connected to individual groups of the solid state light emitting elements 10R, 10G, 10B, and 10W, through conductors (copper foil) formed on the surface or the opposite surface of the substrate 500. Further, the receptacle connectors 501 and 502 are electrically connected to output terminals of the first lighting circuit 2R, the second lighting circuit 2G, the third lighting circuit 2B, and the fourth lighting circuit, via electrical cables.

The first housing 51 has a cuboidal shape, and is formed of a metal plate. The first housing 51 has a window hole 510 in its front face. The four LED modules 50 are housed in the first housing 51 with their surfaces exposed via the window hole 510, and are arranged in a 2 by 2 matrix (see FIG. 5).

Figure 2:
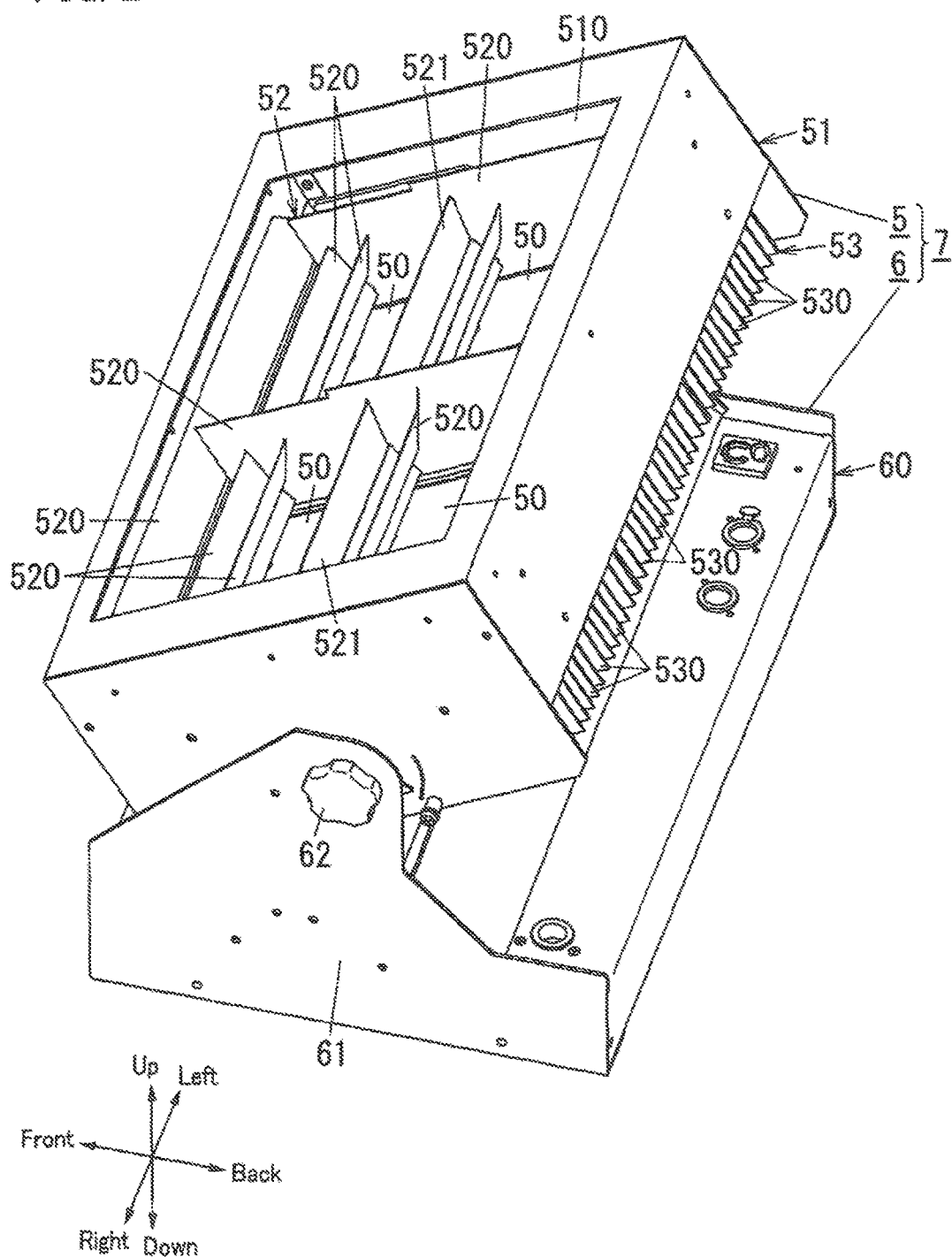
FIG. 2 is a perspective view of a lighting fixture of the embodiment.
Figure 4:
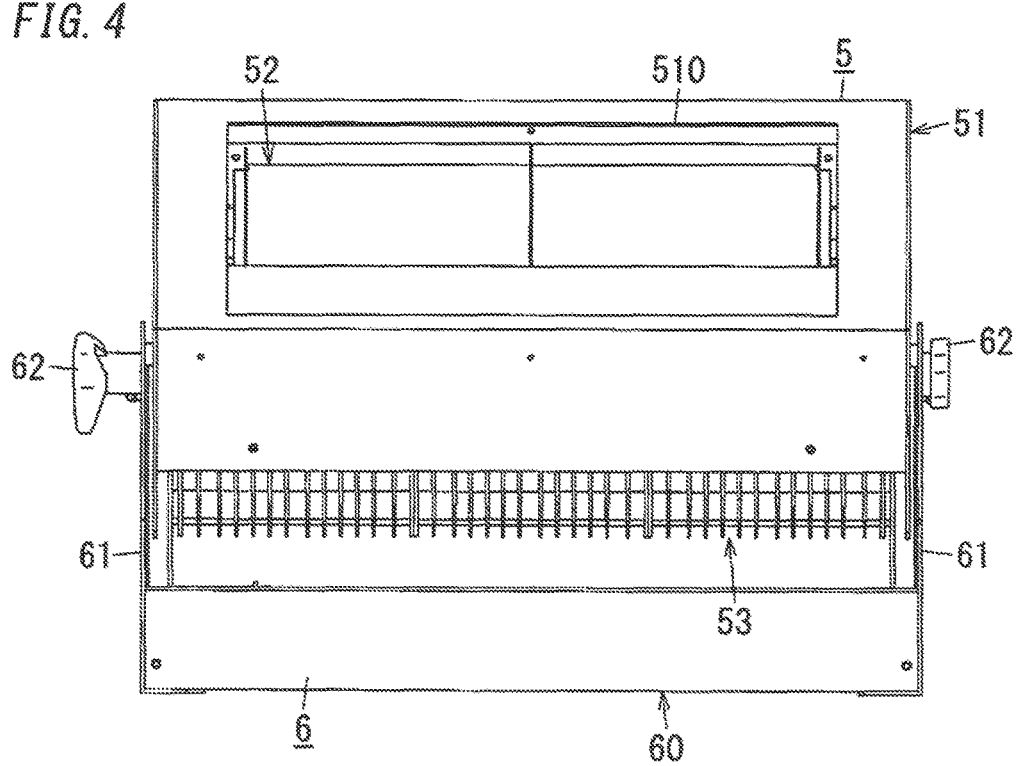
FIG. 4 is a plan view of the lighting fixture of the embodiment.
Figure 5:
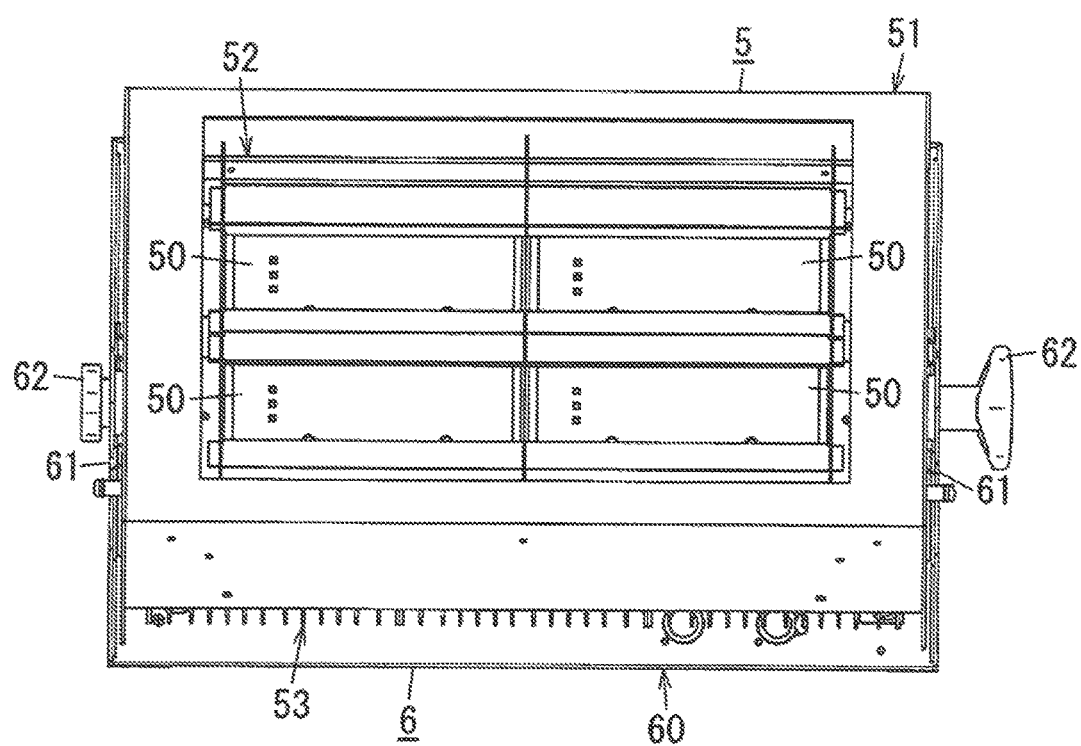
FIG. 5 is a front view of the lighting fixture of the embodiment.

The reflection plate block 52 may include reflective plates 520 and a light blocking plate 521 (see FIG. 2, FIG. 4, and FIG. 5). The reflective plates 520 and the light blocking plate 521 are positioned between the window hole 510 and the surfaces of the LED modules 50 inside the first housing 51, so as to control distribution of light to be emitted from the LED modules 50.

The heat dissipation plate block 53 may include heat dissipating plates 530 which are arranged in thickness directions thereof at regular intervals (see FIG. 2). The heat dissipation plate block 53 is provided to a rear surface of the first housing 51. Note that, the heat dissipation plate block 53 may be thermally coupled with the four LED modules 50 (the substrates 500 thereof) inside the first housing 51.

The power source unit 6 includes a circuit block (lighting device A), a second housing 60 for accommodating the circuit block, and a pair of arms 61. The circuit block includes the first lighting circuit 2R, the second lighting circuit 2G, the third lighting circuit 2B, the fourth lighting circuit, the control unit 3, and the power supply 4.

The circuit block includes printed wiring boards, and circuit parts constituting the first lighting circuit 2R, the second lighting circuit 2G, the third lighting circuit 2B, the fourth lighting circuit, the control unit 3, and the power supply 4 mounted thereon.

Figure 6:
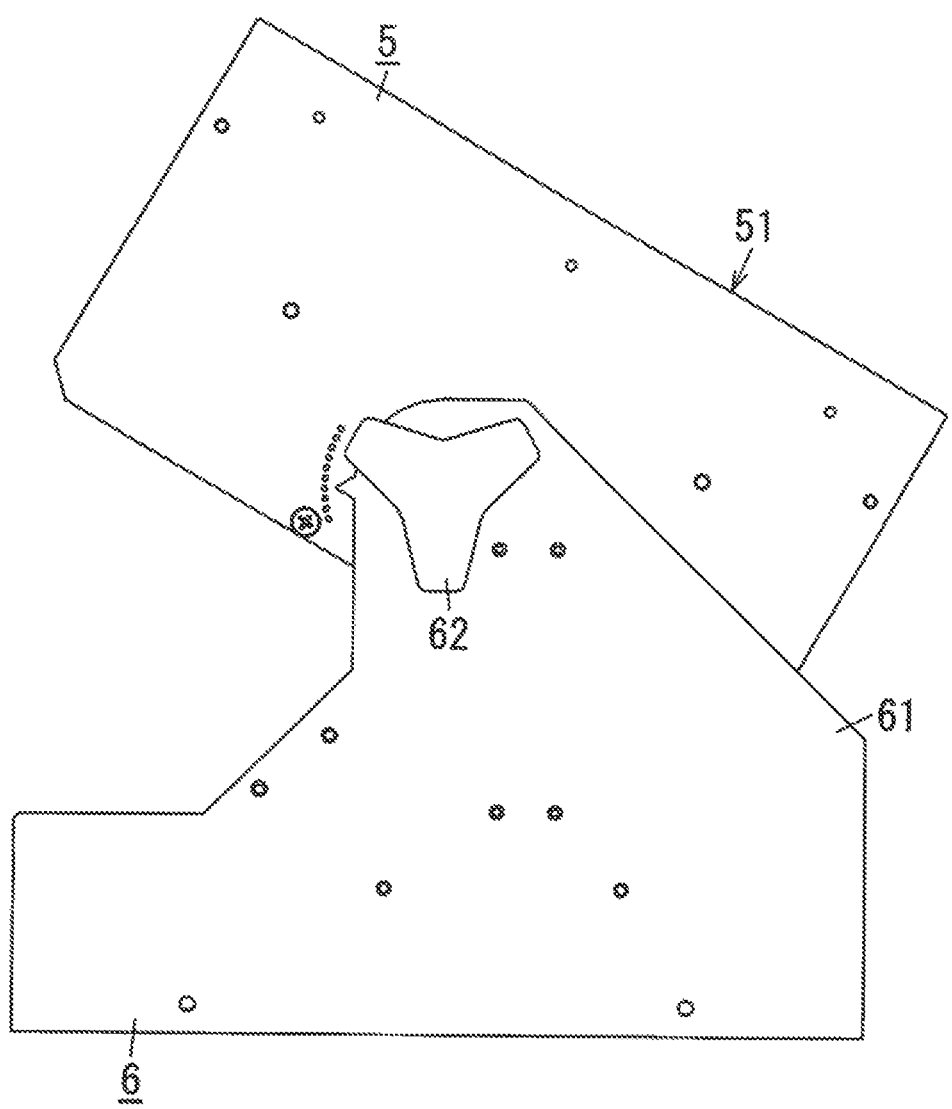
FIG. 6 is a left view of the lighting fixture of the embodiment.

The second housing 60 has a flat cuboidal shape, and is formed of a metal plate. The second housing 60 is configured to accommodate the circuit block (see FIG. 2). The pair of arms 61 extends upright from left and right ends of the second housing 60 (see FIG. 2, FIG. 4, and FIG. 5). As shown in FIG. 6, the width (dimension in the forward and rearward direction) of each of the pair of the arms 61 becomes gradually smaller toward an end (upper end). There are insertion holes provided to the ends of the pair of arm 61. Each insertion hole allows passage of a bolt part of a nob bolt 62. The bolt parts are screwed into threaded holes provided to left and right side surfaces of the first housing 51 through the insertion holes of the ends of the pair of arms 61, and thereby the light source unit 5 is rotatively held by the pair of arms 61.

Figure 7:
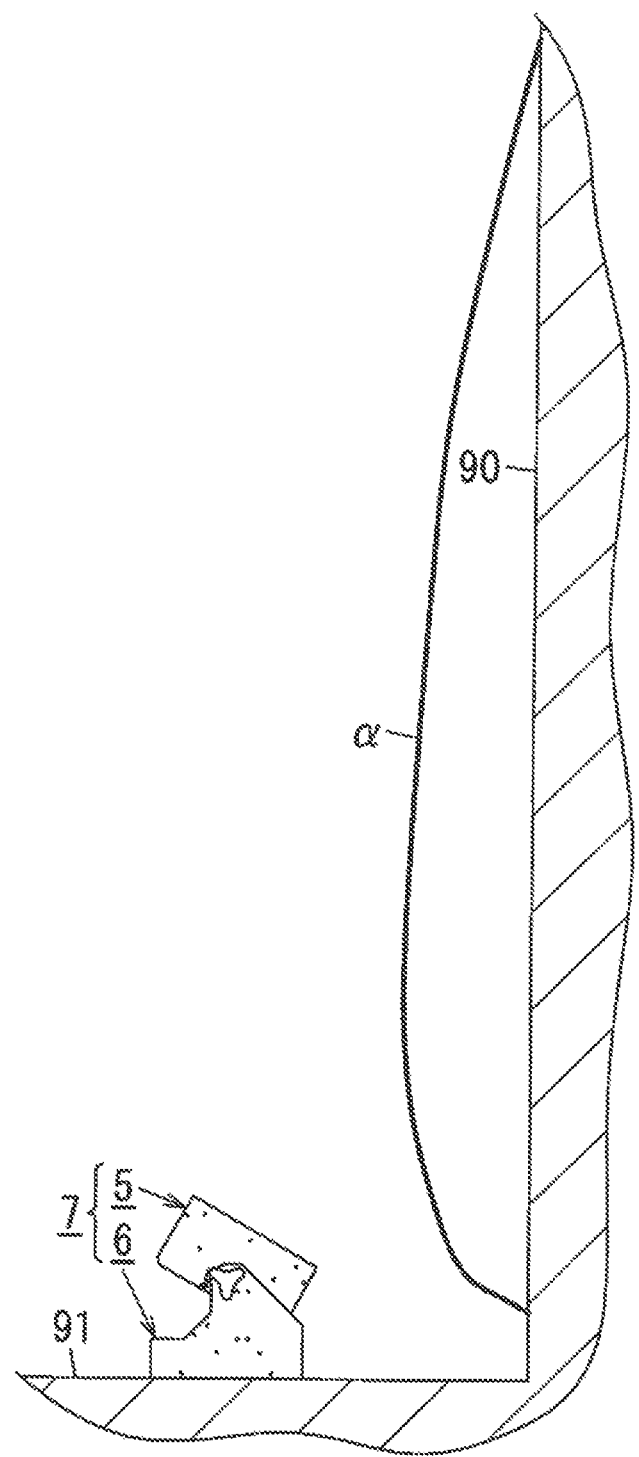
FIG. 7 is an explanatory diagram for a light distribution property of the lighting fixture of the embodiment.

FIG. 7 illustrates a situation in which the lighting fixture 7 is in use. For example, the lighting fixture 7 is situated on a floor 91 to be apart from a background wall surface 90 so that the window hole 510 of the light source unit 5 faces the background wall surface 90. FIG. 7 shows a solid line α representing a light distribution property of the lighting fixture 7. The solid line α of FIG. 7 shows that the lighting fixture 7 can irradiate an area of the background wall surface 90 extending from the lower part close to the floor 91 to the upper part with the almost uniform illumination light.

Note that, a lighting fixture such as a cyclorama light is not always used alone. In some cases, lighting fixtures 7 may be arranged on the floor 91 to simultaneously illuminate the single background wall surface 90. In the case where the lighting fixtures 7 simultaneously illuminate the single background wall surface 90, audience or viewer may feel strange or uncomfortable if there are relatively large differences in chromaticity of the illumination light between the lighting fixtures 7. In view of this, the lighting fixture 7 (the lighting device A) corrects the instruction values $L_{[R\text{-}req]}$, $L_{[G\text{-}req]}$, and $L_{[B\text{-}req]}$ for the respective light colors provided from the dimming control panel, and thereby suppresses differences in chromaticity of the illumination light between the lighting fixtures 7 (the lighting devices A).

Next, the color correction process performed by the control unit 3 of the lighting device A is described in detail with reference to FIG. 8.

For example, an individual difference in chromaticity of the illumination light depends on a rank of a red light emitting diode used as the first solid state light emitting element 10R, a rank of a green light emitting diode used as the second solid state light emitting element 10G, and a rank of a blue light emitting diode used as the third solid state light emitting element 10B. Such a rank represents that a rated chromaticity of a light emitting diode is present in a range in a chromaticity diagram associated with the rank. The rated chromaticity point may be defined as a chromaticity point of light emitted from a light emitting diode when a predetermined current (rated current) flows through the light emitting diode, for example. The range in the chromaticity diagram associated with the rank can be considered a range of an individual difference in chromaticity.

Therefore, the first light source 1R (the first solid state light emitting element 10R), the second light source 1G (the second solid state light emitting element 10G), and the third light source 1B (the third solid state light emitting element 10B) have ranges (a first range, a second range, and a third range) 11R, 11G, and 11B of individual differences in chromaticity.

Figure 8:
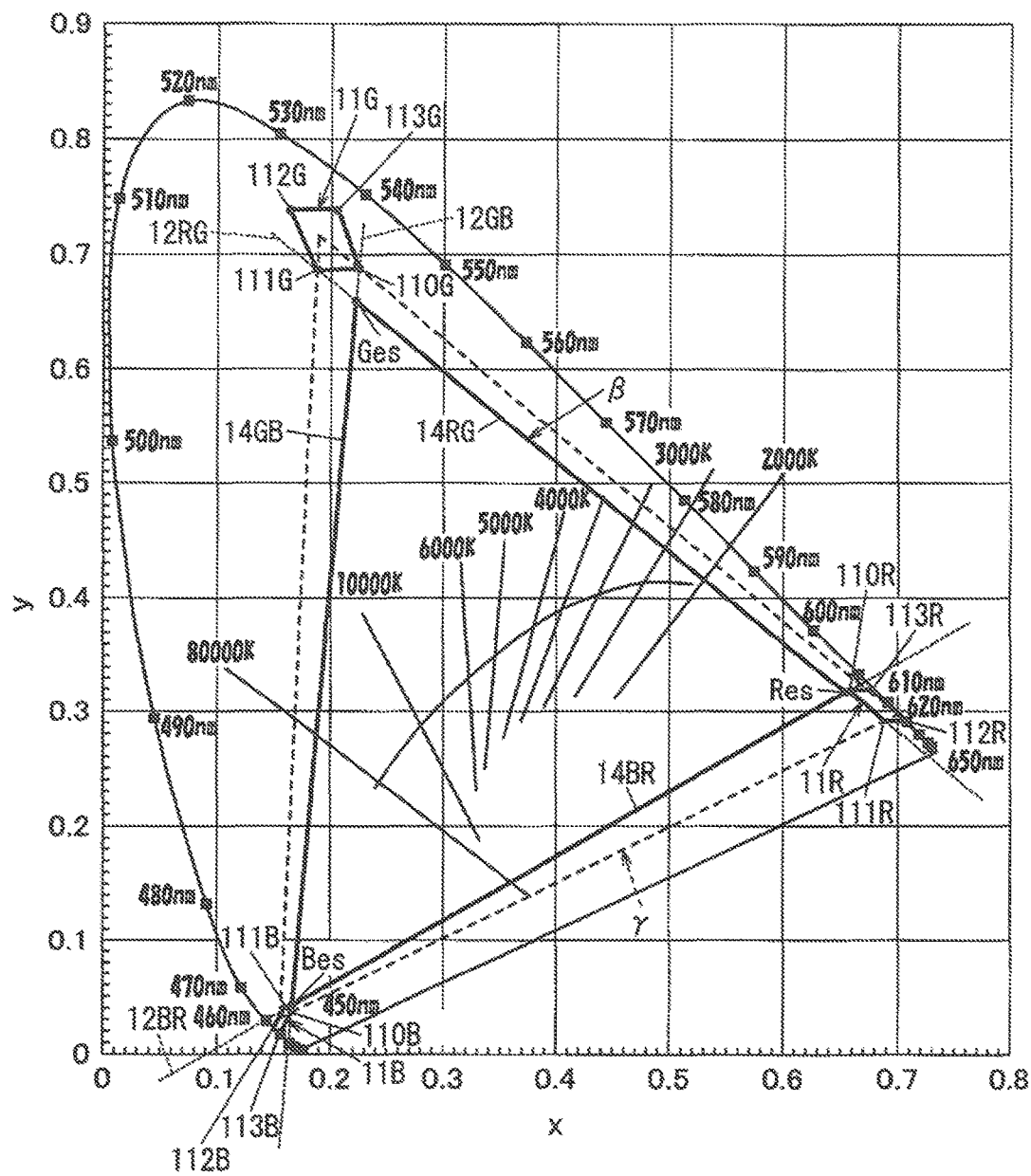
FIG. 8 is a chromaticity diagram for illustrating a color correction process performed by the lighting device and the lighting fixture of the embodiment.

For example, in an xy-chromaticity diagram of FIG. 8, the first, second, and third ranges 11R, 11G, and 11B are supposed to be represented as three quadrangles (parallelograms). It is ensured that, when the rated current is supplied to the first solid state light emitting elements 10R, the chromaticity points (rated chromaticity points) of the light emission colors of the first solid state light emitting elements 10R are in the first range 11R. However, it is not ensured the first solid state light emitting elements 10R have the same rated chromaticity point. This means that the red light emitting diodes have individual differences. The second solid state light emitting elements 10G, and the third solid state light emitting elements 10B also have individual differences in chromaticity.

For this reason, even if the same desired values $I_{RT}$, $I_{GT}$, and $I_{BT}$ for the currents to the respective light sources 1R, 1G, and 1B are provided to the lighting devices, the lighting devices may emit the illumination light with different chromaticity due to the individual differences in chromaticity of the respective solid state light emitting elements 10R, 10G, and 10B if the lighting devices do not perform the color correction process.

In view of this, when the first, second, and third ranges 11R, 11G, and 11B are already known, the chromaticity points (the first rated chromaticity point, the second rated chromaticity point, and the third rated chromaticity point) of the red light, the green light, and the blue light are corrected based on the first, second, and third range 11R, 11G, and 11B. Thus, the desired values $I_{RT}$, $I_{GT}$, and $I_{BT}$ for the respective currents are determined according to correction coefficients including coefficients used for a correction to obtain a corrected chromaticity point (first chromaticity point Res) of the red light, a correction to obtain a corrected chromaticity point (second chromaticity point Ges) of the green light, and a correction to obtain a corrected chromaticity point (third chromaticity point Bes) of the blue light. In other words, the desired values (normal desired values) for the red light with the first rated chromaticity point, the green light with the second rated chromaticity point, and the blue light with the third rated chromaticity point are corrected to desired values (corrected desired values) for the red light with the first chromaticity point Res, the green light with the second chromaticity point Ges, and the blue light with the third chromaticity point Bes, respectively.

Next, how to determine the first chromaticity point Res, the second chromaticity point Ges, and the third chromaticity point Bes is described.

For example, four vertexes of a parallelogram representing the first range 11R of the red light in the xy-chromaticity diagram are defined as a first vertex 110R, a second vertex 111R, a third vertex 112R, and a fourth vertex 113R. Further, four vertexes of a parallelogram representing the second range 11G of the green light in the xy-chromaticity diagram are defined as a first vertex 110G, a second vertex 111G, a third vertex 112G, and a fourth vertex 113G. Moreover, four vertexes of a parallelogram representing the third range 11B of the blue light in the xy-chromaticity diagram are defined as a first vertex 110B, a second vertex 111B, a third vertex 112B, and a fourth vertex 113B (see FIG. 8).

In this regard, a straight line touching the first range 11R of the red light and the second range 11G of the green light, that is, a straight line 12RG passing through the second vertex 111R of the first range 11R and the second vertex 111G of the second range 11G is found. The straight line 12RG is a straight line closest to the third range 11B of straight lines touching the first range 11R and the second range 11G without crossing the first range 11R and the second range 11G in the chromaticity diagram. Further, a straight line touching the second range 11G of the green light and the third range 11B of the blue light, that is, a straight line 12GB passing through the first vertex 110G of the second range 11G and the first vertex 110B of the third range 11B is found. The straight line 12GB is a straight line closest to the first range 11R of straight lines touching the second range 11G and the third range 11B without crossing the second range 11G and the third range 11B in the chromaticity diagram. Additionally, a straight line touching the third range 11B of the blue light and the first range 11R of the red light, that is, a straight line 12BR passing through the second vertex 111B of the third range 11B and the first vertex 110R of the first range 11R is found. The straight line 12BR is a straight line closest to the second range 11G of straight lines touching the third range 11B and the first range 11R without crossing the third range 11B and the first range 11R in the chromaticity diagram. Note that, the ranges 11R, 11G, and 11B of the respective color light are not always represented by boundaries in a strict sense, and thus are represented by lines (approximate boundaries) considered to represent boundaries.

The first chromaticity point Res is defined by an intersection of the two straight lines (the first straight line and the second straight line) 12RG and 12BR. The second chromaticity point Ges is defined by an intersection of the two straight lines (the first straight line and the third straight line) 12RG and 12GB. The third chromaticity point Bes is defined by an intersection of the two straight lines (the third straight line and the second straight line) 12GB and 12BR. In this regard, a triangle β with three sides defined by a section 14RG interconnecting the first chromaticity point Res and the second chromaticity point Ges, a section 14GB interconnecting the second chromaticity point Ges and the third chromaticity point Bes, and a section 14BR interconnecting the third chromaticity point Bes and the first chromaticity point Res is formed. This triangle β is considered to represent an available color range in a case where the lighting device A performs the color correction process (i.e., in the correction mode) (see FIG. 8). Note that, a triangle γ represented with broken lines in FIG. 8 is a triangle with vertexes denoting the chromaticity points of respective color light which are not corrected, and thus represents an available color range in a case where the lighting device A does not perform the color correction process (i.e., in the normal mode).

Next steps are determining combinations of light amounts of the first light source 1R, the second light source 1G, and the third light source 1B necessary for making the chromaticity point of the illumination light composed of the red light of the first light source 1R, the green light of the second light source 1G, and the blue light of the third light source 1B equal to the first chromaticity point Res, the second chromaticity point Ges, and the third chromaticity point Bes, respectively.

For example, the light amounts (luminous fluxes) of the red light of the first light source 1R, the green light of the second light source 1G, and the blue light of the third light source 1B which are necessary for allowing the illumination light to have the chromaticity point equal to the first chromaticity point Res are denoted by $L_{[R\text{-}Res]}$, $L_{[G\text{-}Res]}$, and $L_{[B\text{-}Res]}$, respectively. Further, the light amounts of the red light of the first light source 1R, the green light of the second light source 1G, and the blue light of the third light source 1B which are necessary for allowing the illumination light to have the chromaticity point equal to the second chromaticity point Ges are denoted by $L_{[R\text{-}Ges]}$, $L_{[G\text{-}Ges]}$, and $L_{[B\text{-}Ges]}$, respectively. Additionally, the light amounts of the red light of the first light source 1R, the green light of the second light source 1G, and the blue light of the third light source 1B which are necessary for allowing the illumination light to have the chromaticity point equal to the third chromaticity point Bes are denoted by $L_{[R\text{-}Bes]}$, $L_{[G\text{-}Bes]}$, and $L_{[B\text{-}Bes]}$, respectively. Note that, it is preferable that the light amounts of the light sources 1R, 1G, and 1B be expressed in percent of the light amounts observed when the rated currents flow through the light sources 1R, 1G, and 1B, respectively.

In this regard, chromaticity coordinates (chromaticity coordinates of the rated chromaticity point) of the red light of the first light source 1R are denoted by $(Cx_{[R]}, Cy_{[R]})$, chromaticity coordinates (chromaticity coordinates of the rated chromaticity point) of the green light of the second light source 1G are denoted by $(Cx_{[G]}, Cy_{[G]})$, and chromaticity coordinates (chromaticity coordinates of the rated chromaticity point) of the blue light of the third light source 1B are denoted by $(Cx_{[B]}, Cy_{[B]})$. Further, the light amount of the first light source 1R is denoted by $L_{[R]}$, the light amount of the second light source 1G is denoted by $L_{[G]}$, and the light amount of the third light source 1B is denoted by $L_{[B]}$. Additionally, chromaticity coordinates of the illumination light is denoted by $(Cx, Cy)$ and a light amount of the illumination light is denoted by $L$. According to this situation, the following formulae can be obtained based on additive color mixing.

$$Cx = \frac{\left(L_{[R]}\frac{Cx_{[R]}}{Cy_{[R]}} + L_{[G]}\frac{Cx_{[G]}}{Cy_{[G]}} + L_{[B]}\frac{Cx_{[B]}}{Cy_{[B]}}\right)}{\left(\frac{L_{[R]}}{Cy_{[R]}} + \frac{L_{[G]}}{Cy_{[G]}} + \frac{L_{[B]}}{Cy_{[B]}}\right)} \quad [\text{FORMULA 1}]$$

$$Cy = \frac{(L_{[R]} + L_{[G]} + L_{[B]})}{\left(\frac{L_{[R]}}{Cy_{[R]}} + \frac{L_{[G]}}{Cy_{[G]}} + \frac{L_{[B]}}{Cy_{[B]}}\right)} \quad [\text{FORMULA 2}]$$

$$L = L_{[R]} + L_{[G]} + L_{[B]} \quad [\text{FORMULA 3}]$$

Solving the above three equations for each of $L_{[R]}$, $L_{[G]}$, and $L_{[B]}$ will give the following formulae.

$$L_{[R]} = \frac{Cy_{[R]}}{Cy} L \frac{(Cy_{[B]} - Cy)(Cx_{[G]}Cy_{[B]} - Cx_{[B]}Cy_{[G]}) - (Cy_{[B]} - Cy_{[G]})(CxCy_{[B]} - CyCx_{[B]})}{(Cy_{[B]} - Cy_{[R]})(Cx_{[G]}Cy_{[B]} - Cx_{[B]}Cy_{[G]}) + (Cy_{[B]} - Cy_{[G]})(Cx_{[B]}Cy_{[R]} - Cx_{[R]}Cy_{[B]})} \quad [\text{FORMULA 4}]$$

$$L_{[G]} = \frac{Cy_{[G]}}{Cy} L \frac{(Cy_{[B]} - Cy)(Cx_{[B]}Cy_{[R]} - Cx_{[R]}Cy_{[B]}) - (Cy_{[R]} - Cy_{[B]})(CxCy_{[B]} - CyCx_{[B]})}{(Cy_{[B]} - Cy_{[R]})(Cx_{[G]}Cy_{[B]} - Cx_{[B]}Cy_{[G]}) + (Cy_{[B]} - Cy_{[G]})(Cx_{[B]}Cy_{[R]} - Cx_{[R]}Cy_{[B]})} \quad [\text{FORMULA 5}]$$

$$L_{[B]} = \frac{Cy_{[B]}}{Cy} L \frac{(Cy_{[R]} - Cy)(Cx_{[G]}Cy_{[R]} - Cx_{[R]}Cy_{[G]}) - (Cy_{[R]} - Cy_{[G]})(CxCy_{[R]} - CyCx_{[R]})}{(Cy_{[R]} - Cy_{[B]})(Cx_{[G]}Cy_{[R]} - Cx_{[R]}Cy_{[G]}) + (Cy_{[R]} - Cy_{[G]})(Cx_{[R]}Cy_{[B]} - Cx_{[B]}Cy_{[R]})} \quad [\text{FORMULA 6}]$$

Therefore, by putting in the chromaticity coordinates and the light amount of the first chromaticity point Res for the chromaticity coordinates $(Cx, Cy)$ and the light amount $L$ of the illumination light, the respective light amounts $L_{[R\text{-}Res]}$, $L_{[G\text{-}Res]}$, and $L_{[B\text{-}Res]}$ can be calculated. Similarly, by putting in the chromaticity coordinates and the light amount of the second chromaticity point Ges for the chromaticity coordinates $(Cx, Cy)$ and the light amount $L$ of the illumination light, the respective light amounts $L_{[R\text{-}Ges]}$, $L_{[G\text{-}Ges]}$, and $L_{[B\text{-}Ges]}$ can be calculated. Likewise, by putting in the chromaticity coordinates and the light amount of the third chromaticity point Bes for the chromaticity coordinates $(Cx, Cy)$ and the light amount $L$ of the illumination light, the respective light amounts $L_{[R\text{-}Bes]}$, $L_{[G\text{-}Bes]}$, and $L_{[B\text{-}Bes]}$ can be calculated.

In manufacturing the lighting fixture 7 (the lighting device A), the rated light amount and the rated chromaticity coordinates of each of the first light source 1R, the second light source 1G, and the third light source 1B is measured, and then combinations of the light amounts of the respective light sources 1R, 1G, and 1B corresponding to the respective chromaticity points Res, Ges and Bes are calculated from the measured values and FORMULAE 4 to 6. Note that, it is preferable calculated light amounts be expressed in percent of the light amounts observed when the rated currents flow through the light sources 1R, 1G, and 1B, respectively.

It is preferable that the combinations of the light amounts (ratios) of the light sources 1R, 1G, and 1B corresponding to the respective chromaticity points Res, Ges, and Bes calculated as described above be included in a data table for the color correction process shown in TABLE 1 described below, and stored in the memory of the control unit 3. The memory may include an electrically rewritable semiconductor memory such as a flash memory.

For example, the data table of TABLE 1 shows that the light amounts $L_{[R\text{-}Res]}$, $L_{[G\text{-}Res]}$, and $L_{[B\text{-}Res]}$ of the first chromaticity point Res are 95.00, 3.00, and 2.00, respectively. Further, the data table of TABLE 1 shows that the light amounts $L_{[R\text{-}Ges]}$, $L_{[G\text{-}Ges]}$, and $L_{[B\text{-}Ges]}$ of the second chromaticity point Ges are 5.00, 90.00, and 5.00, respectively. Additionally, the data table of TABLE 1 shows that the light amounts $L_{[R\text{-}Bes]}$, $L_{[G\text{-}Bes]}$, and $L_{[B\text{-}Bes]}$ of the third chromaticity point Bes are 0.00, 7.00, and 93.00, respectively. Note that, the ratio of the light amounts in terms of each of the first chromaticity point Res, the second chromaticity point Ges, and the third chromaticity point Bes is still kept constant even if the light amount (dimming level) of the illumination light varies between 100% and 1%.

TABLE 1

| Dimming Level | Res | | | Ges | | |
|---|---|---|---|---|---|---|
| | $L_{[R\text{-}Res]}$ | $L_{[G\text{-}Res]}$ | $L_{[B\text{-}Res]}$ | $L_{[R\text{-}Ges]}$ | $L_{[G\text{-}Ges]}$ | $L_{[B\text{-}Ges]}$ |
| 100% | 95.00 | 3.00 | 2.00 | 5.00 | 90.00 | 5.00 |
| 99% | 94.05 | 2.97 | 1.98 | 4.95 | 89.10 | 4.95 |

TABLE 1-continued

| | | | | | | |
|---|---|---|---|---|---|---|
| 98% | 93.10 | 2.94 | 1.96 | 4.90 | 88.20 | 4.90 |
| 97% | 92.15 | 2.91 | 1.94 | 4.85 | 87.30 | 4.85 |
| . | . | . | . | . | . | . |
| . | . | . | . | . | . | . |
| . | . | . | . | . | . | . |
| 4% | 3.80 | 0.12 | 0.08 | 0.20 | 0.36 | 0.20 |
| 3% | 2.85 | 0.09 | 0.06 | 0.15 | 0.27 | 0.15 |
| 2% | 1.90 | 0.06 | 0.04 | 0.10 | 0.18 | 0.10 |
| 1% | 0.95 | 0.03 | 0.02 | 0.05 | 0.09 | 0.05 |

| Dimming | Bes | | | Rated Output | | |
|---|---|---|---|---|---|---|
| Level | $L_{[R\text{-}Bes]}$ | $L_{[G\text{-}Bes]}$ | $L_{[B\text{-}Bes]}$ | $L_{[R]}$ | $L_{[G]}$ | $L_{[B]}$ |
| 100% | 0.00 | 7.00 | 93.00 | 100.00 | 100.00 | 100.00 |
| 99% | 0.00 | 6.93 | 92.07 | 99.00 | 99.00 | 99.00 |
| 98% | 0.00 | 6.86 | 91.14 | 98.00 | 98.00 | 98.00 |
| 97% | 0.00 | 6.79 | 90.21 | 97.00 | 97.00 | 97.00 |
| . | . | . | . | . | . | . |
| . | . | . | . | . | . | . |
| . | . | . | . | . | . | . |
| 4% | 0.00 | 0.28 | 3.72 | 4.00 | 4.00 | 4.00 |
| 3% | 0.00 | 0.21 | 2.79 | 3.00 | 3.00 | 3.00 |
| 2% | 0.00 | 0.14 | 1.86 | 2.00 | 2.00 | 2.00 |
| 1% | 0.00 | 0.07 | 0.93 | 1.00 | 1.00 | 1.00 |

As already described, when receiving the command to be transmitted from the dimming control panel, the control unit 3 subjects the instruction values for the respective light amounts included in the command to the color correction process. For example, the instruction values for the respective light amounts of the red light, the green light, and the blue light included in the command are represented by $L_{[R\text{-}req]}$, $L_{[G\text{-}req]}$, and $L_{[B\text{-}req]}$, respectively. Then, the instruction values (corrected instruction values) $L_{[R\text{-}sum]}$, $L_{[G\text{-}sum]}$, and $L_{[B\text{-}sum]}$ for the respective light amounts after the color correction process will be expressed in a matrix shown in following FORMULA 7.

$$\begin{pmatrix} L_{[R\text{-}sum]} \\ L_{[G\text{-}sum]} \\ L_{[B\text{-}sum]} \end{pmatrix} = \begin{pmatrix} L_{[R\text{-}Res]} & L_{[G\text{-}Res]} & L_{[B\text{-}Res]} \\ L_{[R\text{-}Ges]} & L_{[G\text{-}Ges]} & L_{[B\text{-}Ges]} \\ L_{[R\text{-}Bes]} & L_{[G\text{-}Bes]} & L_{[B\text{-}Bes]} \end{pmatrix} \begin{pmatrix} L_{[R\text{-}req]} \\ L_{[G\text{-}req]} \\ L_{[B\text{-}req]} \end{pmatrix} \quad \text{[FORMULA 7]}$$

In more detail, the control unit 3 multiplies the instruction values (the first instruction value, the second instruction value, and the third instruction value) $L_{[R\text{-}req]}$, $L_{[G\text{-}req]}$, and $L_{[B\text{-}req]}$ for the respective light amounts of the red light, the green light, and the blue light given by the dimming control panel, with the correction coefficients (a 3 by 3 matrix shown on the right side of FORMULA 7), thereby executing the color correction process.

By doing the color correction process, the control unit 3 calculates the correction values (the first correction value, the second correction value, and the third correction value) $L_{[R\text{-}sum]}$, $L_{[G\text{-}sum]}$, and $L_{[B\text{-}sum]}$ for the respective light amounts of the red light, the green light, and the blue light. Additionally, the control unit 3 converts the instruction values $L_{[R\text{-}sum]}$, $L_{[G\text{-}sum]}$, and $L_{[B\text{-}sum]}$ of the light amounts resulting from the color correction process into the desired values (the first desired value, the second desired value, and the third desired value) $I_{RT}$, $I_{GT}$, and $I_{BT}$ of the drive currents for the light sources 1R, 1G, and 1B, respectively. Then, the control unit 3 provides the desired values $I_{RT}$, $I_{GT}$, and $I_{BT}$ to the drive circuits 20R, 20G, and 20B of the lighting circuits 2R, 2G, and 2B, respectively.

As described above, in the correction mode, the control unit 3 multiplies the instruction values $L_{[R\text{-}req]}$, $L_{[G\text{-}req]}$, and $L_{[B\text{-}req]}$ by corresponding predetermined correction coefficients to thereby calculate the corrected instruction values $L_{[R\text{-}sum]}$, $L_{[G\text{-}sum]}$, and $L_{[B\text{-}sum]}$. Subsequently, the control unit 3 multiplies the rated values by the corrected instruction values $L_{[R\text{-}sum]}$, $L_{[G\text{-}sum]}$, and $L_{[B\text{-}sum]}$ to thereby calculate the corrected desired values. In contrast, in the normal mode, the control unit 3 multiplies the rated values by the instruction values $L_{[R\text{-}req]}$, $L_{[G\text{-}req]}$, and $L_{[B\text{-}req]}$ to thereby calculate the normal desired values.

The correction coefficients are defined by coefficients for correcting chromaticity points of the solid state light sources 1R, 1G, and 1B to predetermined chromaticity points Res, Ges, and Bes. In other words, the correction coefficients are a set of coefficients for correcting the chromaticity points of the first color light, the second color light, and the third color light to the first chromaticity point Res, the second chromaticity point Ges, and the third chromaticity point Bes, respectively.

In this regard, correcting the chromaticity point of the first color light to the first chromaticity point Res means obtaining the illumination light having the first chromaticity point Res. Similarly, correcting the chromaticity point of the second color light to the second chromaticity point Ges means obtaining the illumination light having the second chromaticity point Ges. Likewise, correcting the chromaticity point of the third color light to the third chromaticity point Bes means obtaining the illumination light having the third chromaticity point Bes.

Especially, the correction coefficients include a combination of a ratio $L_{[R\text{-}Res]}$, a ratio $L_{[G\text{-}Res]}$, and a ratio $L_{[B\text{-}Res]}$. The ratio $L_{[R\text{-}Res]}$ is a ratio of the first drive current corresponding to the first chromaticity point Res to the rated current of the first light source 1R. The ratio $L_{[G\text{-}Res]}$ is a ratio of the second drive current corresponding to the first chromaticity point Res to the rated current of the second light source 1G. The ratio $L_{[B\text{-}Res]}$ is a ratio of the third drive current corresponding to the first chromaticity point Res to the rated current of the third light source 1B. This combination is a coefficient for obtaining the illumination light having the first chromaticity point Res.

Further, the correction coefficients include a combination of a ratio $L_{[R\text{-}Ges]}$, a ratio $L_{[G\text{-}Ges]}$, and a ratio $L_{[B\text{-}Ges]}$. The ratio $L_{[R\text{-}Ges]}$, is a ratio of the first drive current corresponding to the second chromaticity point Ges to the rated current of the first light source 1R. The ratio $L_{[B\text{-}Ges]}$ is a ratio of the second drive current corresponding to the second chromaticity point Ges to the rated current of the second light source 1G. The ratio $L_{[B\text{-}Ges]}$ is a ratio of the third drive current corresponding to the second chromaticity point Ges to the rated current of the third light source 1B. This combination is a coefficient for obtaining the illumination light having the second chromaticity point Ges.

Further, the correction coefficients include a combination of a ratio $L_{[R\text{-}Bes]}$, a ratio $L_{[G\text{-}Bes]}$, and a ratio $L_{[B\text{-}Bes]}$. The ratio $L_{[R\text{-}Bes]}$ is a ratio of the first drive current corresponding to the third chromaticity point Bes to the rated current of the first light source 1R. The ratio $L_{[G\text{-}Bes]}$ is a ratio of the second drive current corresponding to the third chromaticity point Bes to the rated current of the second light source 1G. The ratio $L_{[B\text{-}Bes]}$ is a ratio of the third drive current corresponding to the third chromaticity point Bes to the rated current of the third light source 1B. This combination is a coefficient for obtaining the illumination light having the third chromaticity point Bes.

Note that, it is preferable that the control unit 3 does not subject the light amount of white light (the light amount of the fourth light source 1W) given from the dimming control panel to the color correction process. The reason is that the individual difference in color in terms of the white light can be sufficiently reduced by a common technique such as color mixing and therefore this does not require any consideration on effects on the individual color difference in the color of the illumination light.

For example, the instruction values $L_{[R\text{-}req]}$, $L_{[G\text{-}req]}$, and $L_{[B\text{-}req]}$ for the respective light amounts of the red light, the green light, and the blue light are supposed to be 100%, 61.6%, and 9.4%, respectively, and the light amount (dimming level) of the illumination light is supposed to be 100%.

In the correction mode, the control unit 3 reads out the correction coefficients corresponding to the dimming level of 100% from the data table shown in TABLE 1, and performs the color correction process by multiplying the correction coefficients with the instruction values (see FORMULA 8).

$$\begin{pmatrix} L_{[R\text{-}sum]} \\ L_{[G\text{-}sum]} \\ L_{[B\text{-}sum]} \end{pmatrix} = \begin{pmatrix} 95.00 & 3.00 & 2.00 \\ 5.00 & 90.00 & 5.00 \\ 0.00 & 7.00 & 93.00 \end{pmatrix} \begin{pmatrix} 100 \\ 61.6 \\ 9.4 \end{pmatrix} = \begin{pmatrix} 97.04 \\ 60.91 \\ 13.05 \end{pmatrix}$$ [FORMULA 8]

Further, the control unit 3 converts the instruction values $L_{[R\text{-}sum]}$ of 97.04%, $L_{[G\text{-}sum]}$ of 60.91%, and $L_{[B\text{-}sum]}$ of 13.05% of the light amounts obtained by the color correction process, into the desired values $I_{RT}$, $I_{GT}$, and $I_{BT}$ of the drive currents, respectively. For example, the control unit 3 multiplies the rated current values of the light sources 1R, 1G, and 1B by the instruction values $L_{[R\text{-}sum]}$, $L_{[G\text{-}sum]}$, and $L_{[B\text{-}sum]}$ for the light amounts, to convert them into the desired values $I_{RT}$, $I_{GT}$, and $I_{BT}$ of the drive currents, respectively.

In contrast, the control unit 3 converts the given instruction values $L_{[R\text{-}req]}$ of 100%, $L_{[G\text{-}req]}$ of 61.6%, and $L_{[B\text{-}req]}$ of 9.4% of the light amounts, into the desired values $I_{RT}$, $I_{GT}$, and $I_{BT}$ of the drive currents, respectively. For example, the control unit 3 multiplies the rated current values of the light sources 1R, 1G, and 1B by the instruction values $L_{[R\text{-}req]}$, $L_{[G\text{-}req]}$, and $L_{[B\text{-}req]}$ for the light amounts, to convert them into the desired values $I_{RT}$, $I_{GT}$, and $I_{BT}$ of the drive currents, respectively.

Thus, the first to third drive circuits 20R, 20G, and 20B of the first to third lighting circuits 2R, 2G, and 2B control the first to third switching elements Q11, Q12, and Q13 to supply the first to third drive currents of the desired values $I_{RT}$, $I_{GT}$, and $I_{BT}$ to the light sources 1R, 1G, and 1B, respectively. Note that, the first to third drive circuits 20R, 20G, and 20B adjust the duty cycles of the first to third switching elements Q11, Q12, and Q13, thereby making the drive currents of the light sources 1R, 1G, and 1B equal to the desired values $I_{RT}$, $I_{GT}$, and $I_{BT}$, respectively. Alternatively, the first to third drive circuits 20R, 20G, and 20B adjust the ratios of the conduction periods to the rest periods of the first to third switching elements Q11, Q12, and Q13, thereby making the drive currents of the light sources 1R, 1G, and 1B equal to the desired values $I_{RT}$, $I_{GT}$, and $I_{BT}$, respectively.

Accordingly, when the lighting devices A have a function to execute the color correction process, differences between the chromaticity of the illumination light can be suppressed in a case where the dimming control panel 8 provides the same instruction values to the lighting devices A. In other words, the lighting devices A performing the color correction process have the same first chromaticity point Res of the red light, second chromaticity point Ges of the green light, and third chromaticity point Bes of the blue light included in the illumination light. As a result, the light amounts of the red light with the first chromaticity point Res, the green light with the second chromaticity point Ges, and the blue light with the third chromaticity point Bes are adjusted to the light amounts of the respective colors indicated by the instruction values from the dimming control panel 8. Consequently, differences between the colors of the illumination light of the lighting devices A (the lighting fixtures 7) can be suppressed.

In contrast, when the color correction process is not performed (i.e., in the normal mode), the available color range is represented by the triangle γ shown in FIG. 8, and becomes larger than the available color range in the correction mode (range represented by the triangle β shown in FIG. 8). Instead, compared to the correction mode, the normal mode may offer smaller effects of suppressing differences between the colors of the illumination light of the lighting devices A (the lighting fixtures 7).

Figure 9:
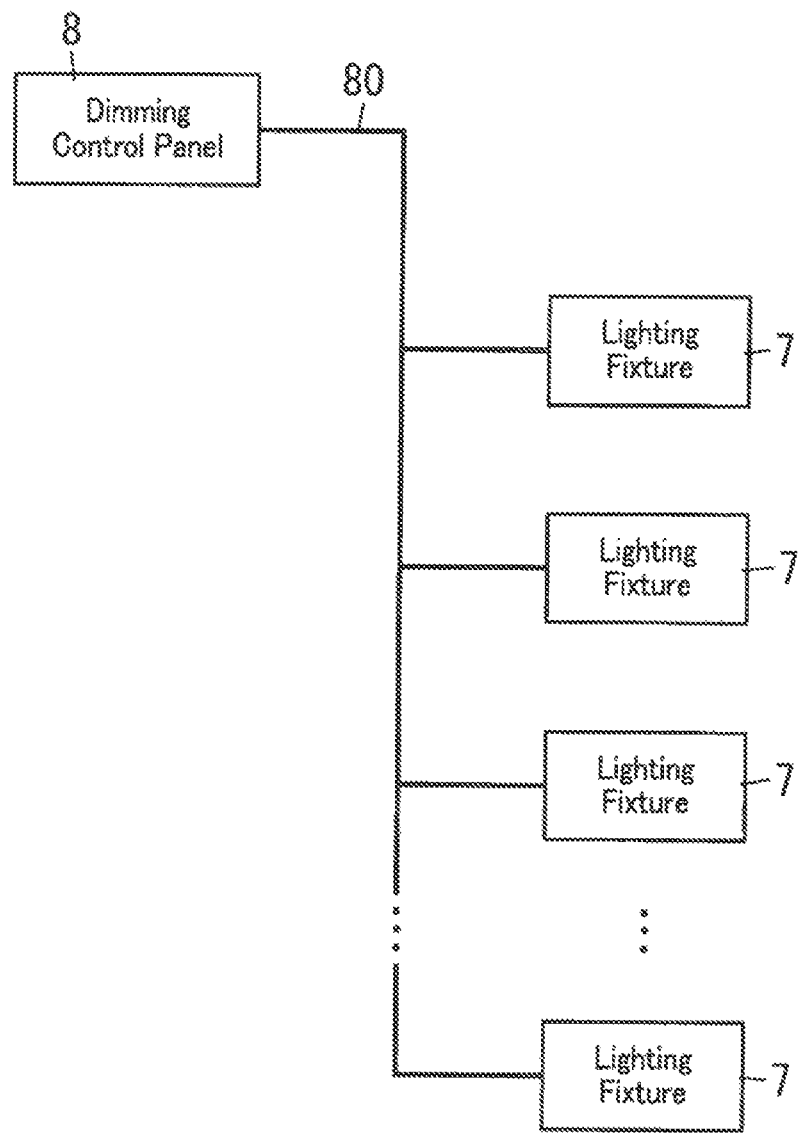
FIG. 9 is a configuration diagram of a lighting system of the embodiment.

As shown in FIG. 9, a lighting system of the present embodiment includes the dimming control panel 8 serving as a controller, and lighting fixtures 7. The lighting fixtures 7 are connected to the dimming control panel 8 successively via a communication cable 80. The dimming control panel 8 transmits a control signal according to a standard communication protocol such as DMX512, to the lighting fixtures 7 via the communication cable 80. In each of the lighting fixtures 7, the control unit 3 receives the control signal transmitted from the dimming control panel 8 and thus controls the first to fourth lighting circuits 2R, 2G, and 2B.

When the control unit 3 is configured to perform the color correction process in any case, a color with a chromaticity point which is included in the available color range γ in a case where the color correction process is not performed but is excluded from the available color range β in a case where the color correction process is performed, is unavailable. In production lighting, it is preferable to expand the available color range as much as possible.

For this reason, the control unit 3 of the lighting device A is configured to select one of the two control modes including the normal mode and the correction mode, to thereby control the first to third lighting circuits 2R, 2G, and 2B. In the normal mode, the control unit 3 controls the first to third lighting circuits 2R, 2G, and 2B so that the first to third drive currents correspond to values indicated by the dimming control panel 8 (the desired values corresponding to the instruction values). In short, the normal mode is a mode of not performing the color correction process. In contrast, in the correction mode, the control unit 3 performs correction (color correction) on the values indicated by the dimming control panel 8, and controls the first to third lighting circuits 2R, 2G, and 2B so that the drive currents correspond to values resulting from the correction (the desired values corresponding to the corrected instruction values). In short, the correction mode is a control mode of performing the color correction process.

It is preferable that the control unit 3 select either the normal mode or the correction mode according to the control signal transmitted from the dimming control panel 8. For example, the dimming control panel 8 may be configured to, when an operator manipulates the dimming control panel 8 to select whether to perform the color correction, transmit, to the control units 3 of the lighting fixtures 7, the control signal including the command indicative of whether to perform the color correction. The control unit 3 may be configured to select either the normal mode or the correction mode collectively for all of colors. In an alternative preferable configuration, when the chromaticity selected by the operator with the faders is excluded from the range β corresponding to color correction but is included in the range γ corresponding to non-color correction, the dimming control panel 8 selects the normal mode. In summary, the control unit 3 may be configured to select either the normal mode or the correction mode individually for each of colors. As described, above, the control unit 3 selects either the normal mode or the correction mode to control the first to third lighting circuits 2R, 2G, and 2B. Thus, it is possible to suppress an undesired effect due to an individual difference in color of illumination light and nevertheless suppress a decrease in a range of available colors.

As described above, the lighting device A according to the present embodiment includes: the lighting circuits (the first to third lighting circuits 2R, 2G, and 2B); and the control unit 3 for controlling the first to third lighting circuits 2R, 2G, and 2B. The first to third lighting circuits 2R, 2G, and 2B are configured to supply drive currents (first to third drive currents) to solid state light sources with different light emission colors (the first light source 1R, the second light source 1G, and the third light source 1B) to thereby turn on them. The control unit 3 is configured to vary the drive currents supplied from the first to third lighting circuits 2R, 2G, and 2B to the first to third light sources 1R, 1G, and 1B to thereby adjust the light amounts of the first to third light sources 1R, 1G, and 1B. Further, the control unit 3 is configured to select either of the two control modes being the normal mode and the correction mode to control the first to third lighting circuits 2R, 2G, and 2B accordingly. The control unit 3 is configured to, in the normal mode, control the first to third lighting circuits 2R, 2G, and 2B so that the first to third drive currents have values equal to values provided from the external device (the dimming control panel 8). The control unit 3 is configured to, in the correction mode, correct values provided from the dimming control panel 8 to obtain the corrected instruction values, and control the first to third lighting circuits 2R, 2G, and 2B so that the first to third drive currents have values equal to the corrected instruction values.

The lighting device A according to the present embodiment is configured in the aforementioned manner and it is thus possible to suppress an undesired effect due to an individual difference in color of illumination light when the control unit 3 performs the color correction process, and also possible to suppress a decrease in a range of available colors when the control unit 3 does not perform the color correction process.

In the lighting device A according to the present embodiment, it is preferable that the control unit 3 be configured to select either of the two control modes being the normal mode and the correction mode collectively for all of the first to third lighting circuits 2R, 2G, and 2B and control the first to third lighting circuits 2R, 2G, and 2B accordingly.

The lighting device A according to the present embodiment is configured in the aforementioned manner and it is thus possible to facilitate switching between the normal mode and the correction mode.

In the lighting device A according to the present embodiment, it is preferable that the control unit 3 be configured to select either of the two control modes being the normal mode and the correction mode individually for each of the first to third lighting circuits 2R, 2G, and 2B and individually control the first to third lighting circuits 2R, 2G, and 2B accordingly.

For example, the control unit 3 may not perform color correction for the chromaticity point of the first light source 1R, but perform color correction for only the chromaticity points of the second light source 1G and the third light source 1B. Alternatively, the control unit 3 may perform color correction for the chromaticity point of the first light source 1R, but not perform color correction for the chromaticity points of the second light source 1G and the third light source 1B. This may lead to a decrease in the number of colors to be subjected to color correction by the control unit 3, and it is thus possible to shorten processing time necessary for completing the color correction process.

In the lighting device A according to the present embodiment, it is preferable that the control unit 3 be configured to, in the correction mode, calculate products of the rated values of the first to third drive currents and the correction coefficients and then control the first to third lighting circuits 2R, 2G, and 2B so that the first to third drive currents have values equal to the products.

The lighting device A according to the present embodiment is configured in the aforementioned manner and it is thus possible to simplify the color correction process performed by the control unit 3.

The lighting fixture 7 according to the present embodiment includes: the lighting device A; the solid state light sources (first to third light sources 1R, 1G, and 1B) with different light emission colors; and the housing (the first housing 51 and the second housing 60) for supporting the lighting device A and the first to third light sources 1R, 1G, and 1B. Further, the lighting system according to the present embodiment includes one or more lighting fixtures 7 and the controller (the dimming control panel 8) for providing values of the first to third drive currents to the one or more lighting fixtures 7.

The lighting fixture 7 and the lighting system according to the present embodiment are configured in the aforementioned manners and it is thus possible to suppress an undesired effect due to an individual difference in color of illumination light and nevertheless suppress a decrease in a range of available colors.

Note that, the lighting device A according to the present embodiment may include three power supplies 4 for supplying DC power to the first lighting circuit 2R, the second lighting circuit 2G, and the third lighting circuit 2B independently. When the lighting circuits 2R, 2G, and 2B are supplied with DC power from different power supplies 4, the lighting device A becomes unsusceptible to increases in power consumptions of the first light source 1R, the second light source 1G, and the third light source 1B.

2. Aspects

As apparent from the above embodiment, the lighting device (A) of the first aspect according to the present disclosure includes: lighting circuits (2R, 2G, 2B) configured to supply drive currents according to desired values ($I_{RT}$, $I_{GT}$, $I_{BT}$) to solid state light sources (1R, 1G, 1B) with different light emission colors, individually; and a control unit (3) configured to set the desired values ($I_{RT}$, $I_{GT}$, $I_{BT}$) of the lighting circuits (2R, 2G, 2B). The control unit (3) has a normal mode and a correction mode. The normal mode is a mode of setting the desired values ($I_{RT}$, $I_{GT}$, $I_{BT}$) to normal desired values corresponding to instruction values ($L_{[R\text{-}req]}$, $L_{[G\text{-}req]}$, $L_{[B\text{-}req]}$) representing a desired color of colors. The correction mode is a mode of setting the desired values ($I_{RT}$, $I_{GT}$, $I_{BT}$) to corrected desired values corresponding to corrected instruction values ($L_{[R\text{-}sum]}$, $L_{[G\text{-}sum]}$, $L_{[B\text{-}sum]}$) obtained by correcting the instruction values ($L_{[R\text{-}req]}$, $L_{[G\text{-}req]}$, $L_{[B\text{-}req]}$).

The lighting device (A) of the second aspect according to the present disclosure would be realized in combination with the first aspect. In the second aspect, the control unit (3) is configured to select either the normal mode or the correction mode according to an external input.

The lighting device (A) of the third aspect according to the present disclosure would be realized in combination with the first or second aspect. In the third aspect, the control unit (3) is configured to select either the normal mode or the correction mode collectively for all of the colors.

The lighting device (A) of the fourth aspect according to the present disclosure would be realized in combination with the first or second aspect. In the fourth aspect, the control unit (3) is configured to select either the normal mode or the correction mode individually for each of the colors.

The lighting device (A) of the fifth aspect according to the present disclosure would be realized in combination with any one of the first to fourth aspects. In the fifth aspect, the instruction values ($L_{[R\text{-}req]}$, $L_{[G\text{-}req]}$, $L_{[B\text{-}req]}$) are defined as ratios of values of the drive currents to rated values of the drive currents of the lighting circuits (2R, 2G, 2B). The control unit (3) is configured to, in the correction mode, multiply the instruction values ($L_{[R\text{-}req]}$, $L_{[G\text{-}req]}$, $L_{[B\text{-}req]}$) by corresponding predetermined correction coefficients to thereby calculate the corrected instruction values ($L_{[R\text{-}sum]}$, $L_{[G\text{-}sum]}$, $L_{[B\text{-}sum]}$), and then multiply the rated values by the corrected instruction values ($L_{[R\text{-}sum]}$, $L_{[G\text{-}sum]}$, $L_{[B\text{-}sum]}$) to thereby calculate the corrected desired values.

The lighting device (A) of the sixth aspect according to the present disclosure would be realized in combination with the fifth aspect. In the sixth aspect, the predetermined-correction coefficients are defined by coefficients for correcting chromaticity points of the solid state light sources (1R, 1G, 1B) to predetermined chromaticity points (Res, Ges, Bes).

The lighting device (A) of the seventh aspect according to the present disclosure would be realized in combination with the fifth aspect. In the seventh aspect, the solid state light sources (1R, 1G, 1B) include a first light source (1R), a second light source (1G), and a third light source (1B). The first light source (1R) includes one or more first solid state light emitting elements (10R) for emitting first color light and has a first range (11R) of an individual difference in chromaticity. The second light source (1G) includes one or more second solid state light emitting elements (10G) for emitting second color light different in color from the first color light and has a second range (11G) of an individual difference in chromaticity. The third light source (1B) includes one or more third solid state light emitting elements (10B) for emitting third color light different in color from the first color light and the second color light and has a third range (11B) of an individual difference in chromaticity. The lighting circuits (2R, 2G, 2B) include a first lighting circuit (2R), a second lighting circuit (2G), and a third lighting circuit (2B). The desired values ($I_{RT}$, $I_{GT}$, $I_{BT}$) include a first desired value ($I_{RT}$), a second desired value ($I_{GT}$), and a third desired value ($I_{BT}$). The first lighting circuit (2R) is configured to supply a first drive current according to the first desired value ($I_{RT}$) to the first light source (DD). The second lighting circuit (2G) is configured to supply a second drive current according to the second desired value ($I_{GT}$) to the second light source (1G). The third lighting circuit (2B) is configured to supply a third drive current according to the third desired value ($I_{BT}$) to the third light source (1B). The illumination light is composed of the first color light, the second color light, and the third color light. The correction coefficients are for correcting a chromaticity point of the first color light, a chromaticity point of the second color light, and a chromaticity point of the third color light to a first chromaticity point (Res), a second chromaticity point (Ges), and a third chromaticity point (Bes), respectively. The first chromaticity point (Res) is defined as an intersection of a straight line (12RG) in contact with the first range (11R) and the second range (11G) and another straight line (12BR) in contact with the first range (11R) and the third range (11B) in the chromaticity diagram. The second chromaticity point (Ges) is defined as an intersection of a straight line (12RG) in contact with the second range (11G) and the first range (11R) and another straight line (12GB) in contact with the second range (11G) and the third range (11B) in the chromaticity diagram. The third chromaticity point (Bes) is defined as an intersection of a straight line (12BR) in contact with the third range (11B) and the first range (11R) and another straight line (12 GB) in contact with the third range (11B) and the second range (11G) in the chromaticity diagram.

The lighting device (A) of the eighth aspect according to the present disclosure would be realized in combination with the seventh aspect. In the eighth aspect, the correction coefficients include a combination of a ratio ($L_{[B\text{-}Res]}$) of the first drive current corresponding to the first chromaticity point (Res) to a rated current of the first light source (1R), a ratio ($L_{[G\text{-}Res]}$) of the second drive current corresponding to the first chromaticity point (Res) to a rated current of the second light source (1G), and a ratio ($L_{[B\text{-}Res]}$) of the third drive current corresponding to the first chromaticity point (Res) to a rated current of the third light source (1B). The correction coefficients include a combination of a ratio ($L_{[R\text{-}Ges]}$) of the first drive current corresponding to the second chromaticity point (Ges) to a rated current of the first light source (1R), a ratio ($L_{[G\text{-}Ges]}$) of the second drive current corresponding to the second chromaticity point (Ges) to a rated current of the second light source (1G), and a ratio ($L_{[B\text{-}Ges]}$) of the third drive current corresponding to the second chromaticity point (Ges) to a rated current of the third light source (1B). The correction coefficients include a combination of a ratio ($L_{[R\text{-}Bes]}$) of the first drive current corresponding to the third chromaticity point (Bes) to a rated current of the first light source (1R), a ratio ($L_{[G\text{-}Bes]}$) of the second drive current corresponding to the third chromaticity point (Bes) to a rated current of the second light source (1G), and a ratio ($L_{[B\text{-}Bes]}$) of the third drive current corresponding to the third chromaticity point (Bes) to a rated current of the third light source (1B).

The lighting device (A) of the ninth aspect according to the present disclosure would be realized in combination with any one of the fifth to eighth aspects. In the ninth aspect, the control unit (3) is configured to, in the normal mode, multiply the rated values by the instruction values ($L_{[R\text{-}req]}$, $L_{[G\text{-}req]}$, $L_{[B\text{-}req]}$) to thereby calculate the normal desired values.

The lighting fixture (7) of the tenth aspect according to the present disclosure includes: the solid state light sources (1R, 1G, 1B); the lighting device (A) of any one of the first to ninth aspects for lighting the solid state light sources (1R, 1G, 1B); and a housing (51, 60) for bearing the solid state light sources (1R, 1G, 1B) and the lighting device (A).

The lighting system of the eleventh aspect according to the present disclosure includes: one or more lighting fixtures (7) of the tenth aspect; and a controller (8) for providing the instruction values ($L_{[R\text{-}req]}$, $L_{[G\text{-}req]}$, $L_{[B\text{-}req]}$) to the one or more lighting fixtures (7).

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A lighting device comprising:
   lighting circuits configured to supply drive currents according to desired values to solid state light sources with different light emission colors, individually; and
   a control unit configured to set the desired values of the lighting circuits,
   the control unit having a normal mode and a correction mode,
   the normal mode being a mode of setting the desired values to normal desired values corresponding to instruction values representing a desired color of colors,
   the correction mode being a mode of setting the desired values to corrected desired values corresponding to corrected instruction values obtained by correcting the instruction values,
   the instruction values being defined as ratios of values of the drive currents to rated values of the drive currents of the lighting circuits, and
   the control unit being configured to, in the correction mode, multiply the instruction values by corresponding predetermined correction coefficients to thereby calculate the corrected instruction values, and then multiply the rated values by the corrected instruction values to thereby calculate the corrected desired values.

2. The lighting device of claim 1, wherein
   the control unit is configured to select either the normal mode or the correction mode according to an external input.

3. The lighting device of claim 1, wherein
   the control unit is configured to select either the normal mode or the correction mode collectively for all of the colors.

4. The lighting device of claim 1, wherein
   the control unit is configured to select either the normal mode or the correction mode individually for each of the colors.

5. The lighting device of claim 1, wherein
   the predetermined correction coefficients are defined by coefficients for correcting chromaticity points of the solid state light sources to predetermined chromaticity points.

6. The lighting device of claim 1, wherein
   the control unit is configured to, in the normal mode, multiply the rated values by the instruction values to thereby calculate the normal desired values.

7. A lighting fixture comprising:
   the lighting device of claim 1 for lighting the solid state light sources;
   the solid state light sources; and
   a housing for bearing the solid state light sources and the lighting device.

8. A lighting system comprising:
   one or more lighting fixtures of claim 7; and
   a controller for providing the instruction values to the one or more lighting fixtures.

* * * * *